United States Patent [19]

Durrant et al.

[11] Patent Number: 4,699,219
[45] Date of Patent: Oct. 13, 1987

[54] CULTIVATOR DRAG BAR AND MOUNTING THEREFOR

[75] Inventors: John T. Durrant, Schaghticoke; Greg K. Deily, Troy, both of N.Y.

[73] Assignee: Garden Way Incorporated, Troy, N.Y.

[21] Appl. No.: 899,777

[22] Filed: Aug. 22, 1986

Related U.S. Application Data

[63] Continuation of Ser. No. 595,958, Apr. 2, 1984, abandoned.

[51] Int. Cl.$^4$ ............................................. A01B 33/02
[52] U.S. Cl. ..................................... 172/42; 172/397
[58] Field of Search ................. 172/42, 43, 397, 398, 172/429, 16, 244, 259, 364

[56] References Cited

U.S. PATENT DOCUMENTS 3,792,734  2/1974  Ellis ........................................ 172/43
4,164,983  8/1979  Hoch ....................................... 172/43

OTHER PUBLICATIONS

International Harvester Co., "International 526A Rotary Tiller"/setting up instructions/Owner's Manual, p. 15, (IHC part No. 1096073R1), Nov. 1976.

Primary Examiner—Richard J. Johnson
Assistant Examiner—Terrence L. B. Brown
Attorney, Agent, or Firm—Hayes & Reinsmith

[57] ABSTRACT

The support wheels and drag stake of a motor driven cultivating device are connected to the main frame of the device by independent mounting brackets at a location rearward of the tines. The support wheels and drag bar are interconnected by a sliding collar-bar which is rigidly attached to the axle of the wheels, thereby allowing for the simultaneous pivoting of drag stake and support wheels between a forward transport position, wherein the drag stake is in an inactive elevated position, and a rearward working position, wherein the drag stake is disposed at an angle off of the vertical for engaging the earth and retarding the forward progress of the device.

3 Claims, 2 Drawing Figures

CULTIVATOR DRAG BAR AND MOUNTING THEREFOR

This application is a continuation of prior U.S. application Ser. No. 595,958, filed Apr. 2, 1984, now abandoned.

BACKGROUND OF THE INVENTION

The present invention relates to motor driven rotary cultivating devices having particular utility for front-end earth working. More specifically, the invention relates to the manner of supporting and interconnecting support wheels and drag bar to ensure that the wheels and drag bar move simultaneously between a working position and a transport position and to the location and orientation of the drag bar in its working position allowing it, in the preferred embodiment, to extend slightly rearward at an angle to the vertical providing a self-cleaning feature.

Pivotally mounted drag bars for use in controlling the cultivating or tilling functions of a walk-behind device are well known. Moreover, drag bars whose position is controlled by the adjustment of wheel position are also disclosed in prior art. U.S. Pat. No. 4,164,983 issued to Hoch on Aug. 21, 1979 discloses a walk-behind tiller with singularly mounted drag stake and wheels which patent is representative of the type of device here under consideration. Specifically, this Hoch patent discloses the use of a pivotable over center wheel mounting arrangement, which arrangement controls the position of the drag bar. The arrangement is adjustable for movement between two positions, an extreme forward position for establishing a transport condition and an extreme rearward position for establishing a working position. The patent also discloses the use of a bracket which constitutes the sole means for interconnecting and attaching the wheels and drag stake to the frame.

SUMMARY OF THE INVENTION

Accordingly it is a principal object of the present invention to provide an improved manner of interconnecting separately mounted support wheels and drag stake in a motor driven rotary cultivating device.

Another object of the invention is to provide a motor driven rotary cultivating device with a pair of separately mounted support wheels and drag stake interconnected by means of a sliding collar bar attached to the wheel axle such that the drag stake enters the ground rearwardly of the wheel axle.

Another object is to provide such a device having a pair of wheels and drag stake mounted separately relative to the main chassis and such that the wheels are easily moveable between a forward transport position and a rearward working position and the drag stake is easily moveable between a raised transport position and a lowered working position.

Yet another object is to provide a device with a sliding collar bar for interconnecting the support wheels and drag stake which vastly simplifies the mounting construction as found in prior art by making the structural arrangement of the drag stake and wheel assembly more compact and efficient.

Yet another object is to provide a device having a drag stake which is constructed and mounted in a manner permitting vertical adjustment thereof.

A more specific object is to provide a device having a drag stake as described in the preceding objects with the drag stake inclined slightly rearwardly and downwardly toward its lower earth engaging end to provide a self-cleaning feature.

A better understanding of the objects, advantages, features, properties and relations of the invention will be obtained from the following detailed description and accompanying drawings which set forth an illustrative embodiment and are indicative of the various ways in which the principles of the invention are employed.

DESCRIPTION OF THE PREFERRED EMBODIMENT

Figure 1:
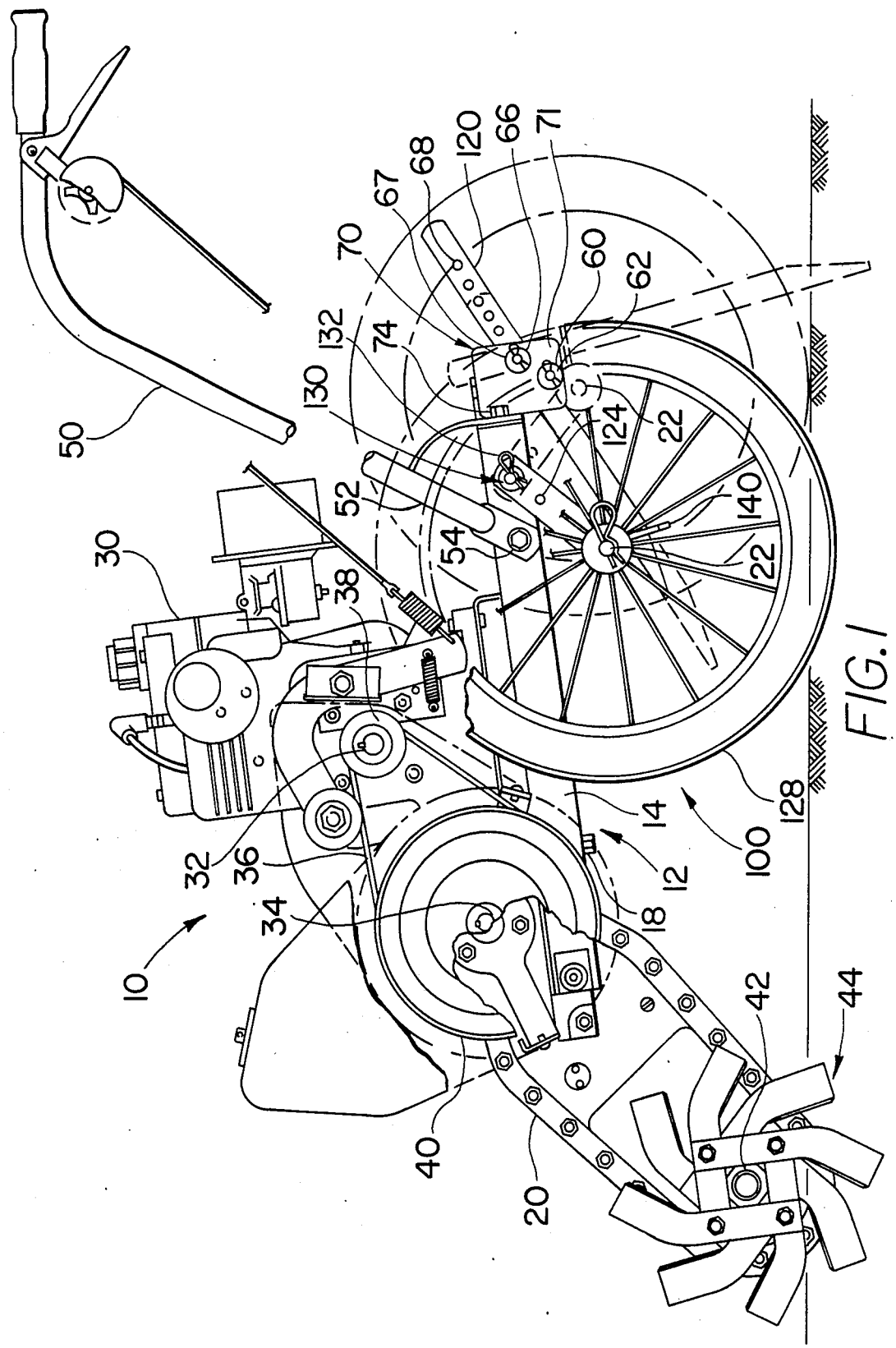
FIG. 1 is a side view, partly broken away, of a motor driven rotary cultivator constructed in accordance with the present invention and showing the respective transport positions of the wheels and drag stake in solid lines and showing the respective working positions of the wheels and drag stake in broken lines.

A general description of the invention will be made first in connection with FIG. 1. The cultivating device, indicated in its entirety by reference numeral 10, includes a main chassis 12 defined by a pair of channel members, only one shown at 14, having inner flanges (not shown) on opposite sides of and bolted, as at 18, to a chain case 20 which inclines downwardly and forwardly relative to the chassis 12.

Mounted on chassis 12 is an internal combustion engine 30 having an engine output shaft 32. Arranged downward to the front of the engine shaft 32 is a shaft 34 which is located in the upper end of chain case 20, and provided for transferring the rotation of engine shaft 32 to shaft 34 is a drive belt 36, which is disposed about a small pulley 38 fixed to engine shaft 32 and a larger pulley 40 fixed to shaft 34. Journalled in the lower end of chain case 20 is a tine drive shaft 42 to which a plurality of tines or blades 44 are affixed. Rotation of shaft 34 is transferred to tine shaft 42 by means of a chain and drive mechanism (not shown) of conventional construction.

As appears in solid lines in FIG. 1, a support wheel assembly 100 and a drag stake 120 are disposed in their respective forward transport position. Drag stake 120 is fixed to a rear end portion of chassis 12 by means of a mounting bracket 70. Specifically, bracket 70 comprises opposed plates, only one shown at 71, each having first portions spaced apart and respectively embracing a rearward portion of chassis 12 and being secured thereto by means of two bolts, as at 74, which extend through aligned sets of holes provided in the rear portion of the chassis 12 and plates 71. Bracket plates 71 are provided with a further set of holes such as at 66 which align with a set of holes 68 located in drag stake 120 to position drag stake 120 to a desired depth in the earth. Drag stake 120 is positioned at a desired depth by inserting a locking device 67, such as a hitch pin, washer and hairpin, into the aligned set of holes in bracket plates 71 and the drag stake opening 68. A third set of holes 60 is located in the lower forward section of bracket plates 71 which hold a lock device 62. Lock device 62, shown here as a hitch pin, washer and hairpin assembly, secures wheel axle 22 in either the forward transport position or the rearward working position and must be removed to allow wheel assembly 100 to pivot from one position to the other.

Wheel assembly 100 includes a pair of legs, only one shown at 124, embracing outer surfaces of channel members 14, a pair of wheels, only one shown at 128, mounted for rotation about wheel axis 22 and a sliding collar bar 140 joined at the central portion of the wheel axle 22 by weldments. Legs 124 embrace channel members 14 at a hitch pin assembly 130 which defines an axis about which wheel assembly 100 may be swung from a forward position disposing wheel assembly 100 and drag stake 120 in respective transport positions, as shown in solid lines in FIG. 1, to a rearward position disposing wheel assembly 100 and drag stake 120 in their respective working position, as illustrated in broken lines in FIG. 1.

Figure 2:
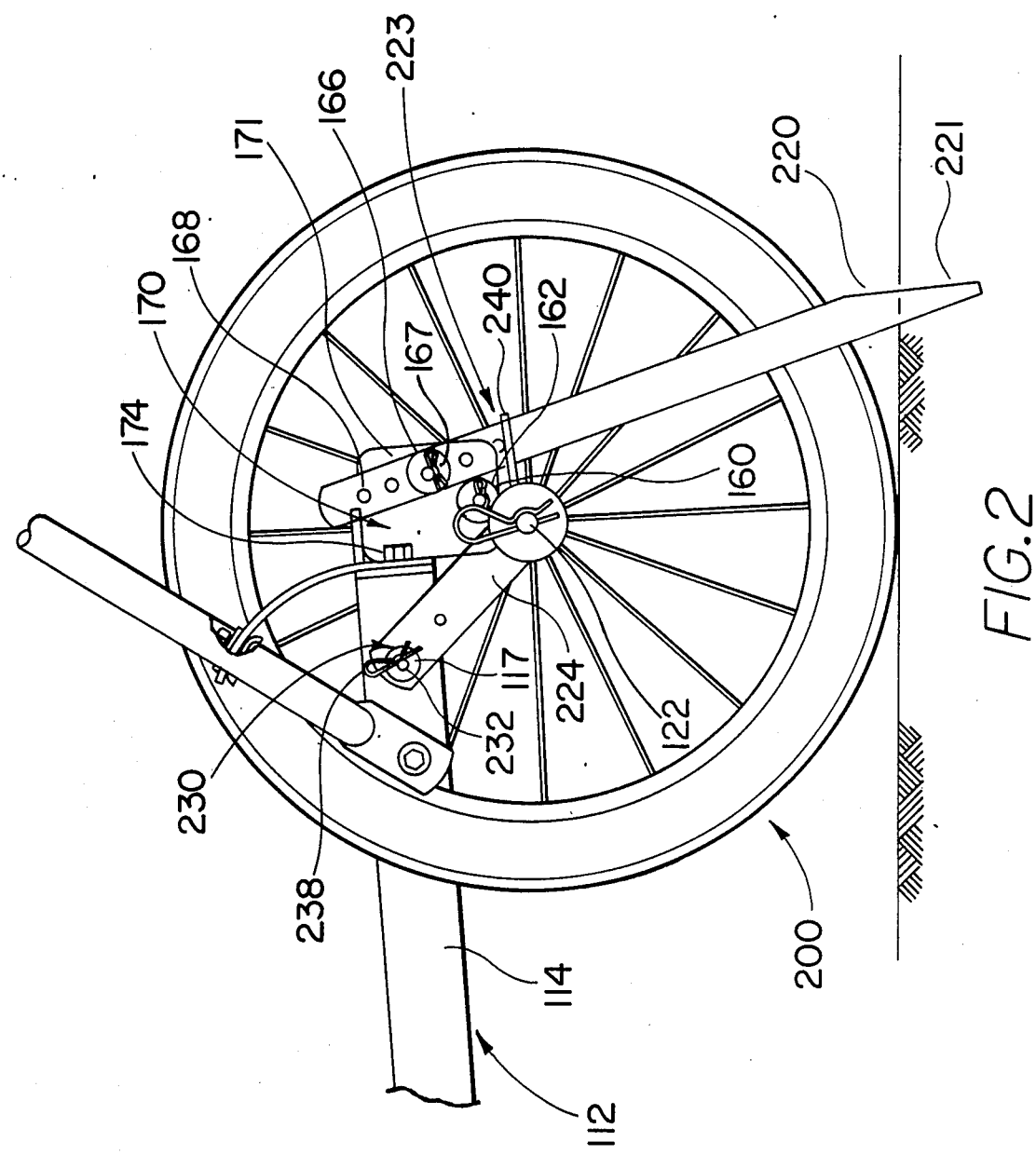
FIG. 2 is an enlarged side view of certain elements of the cultivator of FIG. 1 illustrating the respective working positions of the wheels and drag stake.

A more detailed description of the structure and operation of the motor driven rotary device will now be made with reference to FIG. 2 which illustrates the same components as in FIG. 1 but on an enlarged scale. As appears in FIG. 2, support wheel assembly 200 and drag stake 220 are disposed in their respective working positions. Wheel assembly 200 is attached to chassis 112 by means of a hitch pin assembly 230. Specifically, hitch pin assembly 230 comprises a rod 232 which extends through axially aligned sets of holes provided in channel members 114, two flat washers 117 located on the outer surfaces of the legs 224, and hair pin 238 which passes through a hole located in the rod 232. Hitch pin assembly 230 is located at the rear of chassis 112 and defines an axis about which wheel assembly 200 may be swung from a forward position disposing wheel assembly 200 and drag stake 220 in respective transport positions, to a rearward position disposing wheel assembly 200 and drag stake 220 in respective working positions.

Wheel assembly 200 includes two metal legs (such as at 224 extending from opposite channel members such as at 114) attached to wheel axle 122 by weldments, not shown, and a pair of wheels 228 rotatably mounted to axle 122. Metal legs 224 extend downward from channel members 114 and 116 from hitch pin assembly connections such as at 230. A sliding collar bar 240 projects centrally from weldments behind wheel axle 122 to enclose drag stake 220 within a narrow rectangular groove. Sliding collar bar 240 guides drag stake 220 into either the transport position or working position when wheel assembly 200 is shifted about pivot 230 such as by removing locking device 162. The interconnecting of drag stage 220 and wheel assembly 200 permits drag stake 220 and wheel assembly 200 to be moved into the desired positions simultaneously without the removal or adjustment of separate nuts and pins.

Drag stake 220 comprises an elongate flat bar 223 having a series of holes 168 provided within the upper portion thereof and having a lower end 221 adapted to penetrate the ground. Drag stake 220 is attached to the rear portion of chassis 112 by means of a bracket 170 which is affixed to the rear end portion of chassis 112 by bolts, as at 174. Drag stake 220 projects centrally between closely spaced portions of a pair of bracket plates (only one shown at 171) with those portions having cooperating parts fixed together through a first opening 106, by which lock member 167 in the illustrated form of a hitch pin, washer and hairpin respectively, pass. Lock member 167 also forms the means for confining drag stake 220 between plates 171. First opening 166 provided in plates 171 registers with a selected one of stake holes 168 and lock member 167 through opening 106 and is received in selected hole 168 and secured into position to hold stake 220 in a selected position in an angle slightly inclined to the vertical for entering the ground to a desired depth when stake 220 is in its working position. The inclined angle of stake 220 relative to the vertical allows stake 220 to be self-cleaning. The angle of the stake is such that upon engaging the earth in its working position, the soil is pushed around the stake edges. No accumulation of soil occurs. Another opening 160 is provided in plates 171 such that lock device 162, shown here as a hitch pin, washer and hairpin assembly, may be inserted to hold wheel axle 122 in either of the transport or working positions. When in the transport position, lock device 162 must be removed from plates 171 to allow the wheel assembly 200 to pivot about hitch pin assembly 230 into the working position. The necessity of reinserting lock device 162 to fix wheel assembly 200 in the working position is dependent upon operator preference and the working conditions. However, lock device 162 can be reinserted to hold wheel axle 122 in the rearward working position and prevent axle 122 from swinging into forward transport position. Lock device 162 can be used to hold wheel axle 122 in the forward transport position when wheel assembly 200 is so disposed.

Referring once again to FIG. 1, a hole (not shown) is provided for in the top of bracket 70 into which lock device 62 may be inserted. With lock device 62 out of opening 60, wheel assembly 120 can be swung between forward transport position and rearward working position to compensate for varying working conditions by lifting the backend of device 10 off the ground and in a flicking motion of the handle bars 50 alternate wheel assembly 100 between the two positions.

As illustrated in FIG. 1, the motor driven rotary device 10 includes a rearwardly projecting handle 50 including a pair of legs, such as the one shown at 52, attached by bolts 54 to chassis channel members 14.

The operation of the motor driven rotary device is as follows. With wheels 100 and drag stake 120, through interconnection of sliding collar bar 140, being disposed in its forward position, shown in solid lines in FIG. 1, and with the power transmission between pulleys 32 and 34 being interrupted, power driven rotary device 10 is ready to be transported since drag stake 120 and wheels 100 are then respectively in their raised and forward transport position. Transporting of the power driven rotary device is accomplished by pivoting device 10 back on wheels 100, by pressing downward on handles 50 and then by pushing or pulling the device to a desired work site.

The power driven rotary device is then readied for operation by removing lock pin 62. Rotary driven power device is then pushed forward by use of handles 50 which causes wheel assembly 100 to pivot backwards at hitch pin 130, wherein wheel assembly 100 and drag stake 120 are in their rearward working position, as illustrated in broken lines in FIG. 1. Drive belt 36 is then tensioned by means not shown to establish a driving relationship between engine 30 and tines 44. If drag stake 120 has not penetrated the ground to the extent that wheels 128 rest upon the ground, the operator may effect such result by adjusting the vertical position of stake 120. Drag stake lock pin 67 is then replaced in its proper location. Lock pin 62 may be replaced in bracket opening 60 if necessary.

To again ready power driven rotary device for transport, the operator needs only remove lock pin 62 (if necessary). Wheel assembly 100 is then free to pivot about hitch pin 130 and the operator can easily place the device in its transport position by pulling on handles 50 toward himself. Once in its transport position, wheel assembly 100 and axle 122 are held in place by reinserting lock pin 62.

As will be apparent to persons skilled in the art, various modifications, adaptations and variations of the foregoing specific disclosure can be made without departing from the teachings of this invention.

We claim:

1. An earthworking cultivator comprising
a chassis;
a set of rotary earth working tines supported by said chassis;
a pair of wheels;
mounting means supporting the pair of wheels on the chassis for simultaneous swinging movement about a first pivot axis between a forward transport position and a rearward working position;
a drag stake pivotally mounted on the chassis at a second pivot axis positioned rearwardly of the first pivot axis; and
connecting means fixed to the mounting means and interconnecting the wheels and the drag stake for simultaneously pivoting the drag stake about its mounting and the wheels about their mounting when the wheels are moved between a forward transport position, wherein the stake is in a relatively raised position, and a rearward working position, wherein the stake is in a lowered, earth engaging position.

2. An earth working cultivator comprising a chassis including a wheel axle; a set of rotary earth working tines supported by said chassis; a pair of wheels mounted on the wheel axle; means supporting the wheel axle and the pair of wheels on the chassis for simultaneous swinging movement about a pivot axis between a forward transport position and a rearward working position; a drag stake pivotally mounted on the chassis at a position rearwardly of the wheel pivot axis, and a sliding collar bar rigidly connected to the wheel axle and interconnecting the wheels and the drag stake for simultaneously pivoting the drag stake about its mounting and the wheels about their mounting when the wheels are moved between a forward transport position, wherein the stake is in a relatively raised position, and a rearward working position, wherein the stake is in a lowered, earth engaging position, the sliding collar bar shifting said drag stake relative to the chassis and the wheels so as to orient the drag stake in an angularly inclined relation to the vertical with its lower end in rearwardly disposed relation to its pivot point when in its lowered, earth working position, and to orient the drag stake with its lower end in forwardly disposed relation to its pivot point when in its raised, transport position.

3. The rotary cultivator defined in claim 2 wherein
said drag stake is located at least in part behind said wheel axle, and
said drag stake is longitudinally adjustably positioned relative to its mounting allowing the drag stake to be adjusted to a proper length to engage the earth.

* * * * *

UNITED STATES PATENT AND TRADEMARK OFFICE
CERTIFICATE OF CORRECTION

PATENT NO. : 4,699,219

DATED : October 13, 1987

INVENTOR(S) : John T. Durrant and Greg K. Deily

It is certified that error appears in the above—identified patent and that said Letters Patent is hereby corrected as shown below:

Column 3, line 63, wherein the number "106" should be --166--.

Column 4, line 1, wherein the number "106" should be --166--.

Signed and Sealed this

Seventeenth Day of May, 1988

Attest:

DONALD J. QUIGG

Attesting Officer

Commissioner of Patents and Trademarks